N. W. Hubbard.
Parlor Skate.
Nº 96117.   Patented Oct. 26. 1869

Witnesses:
A. W. Almquist
Alex F. Roberts

Inventor:
N. W. Hubbard,
per
Attorneys.

UNITED STATES PATENT OFFICE.

N. W. HUBBARD, OF NEW YORK, N. Y.

IMPROVEMENT IN PARLOR-SKATES.

Specification forming part of Letters Patent No. 96,117, dated October 26, 1869.

*To all whom it may concern:*

Be it known that I, N. W. HUBBARD, of New York, in the county of New York and State of New York, have invented a new and Improved Parlor and Sidewalk Skate; and I do hereby declare that the following is a full, clear, and exact description thereof, which will enable others skilled in the art to make and use the same, reference being had to the accompanying drawings, forming part of this specification, in which—

Figure 1:
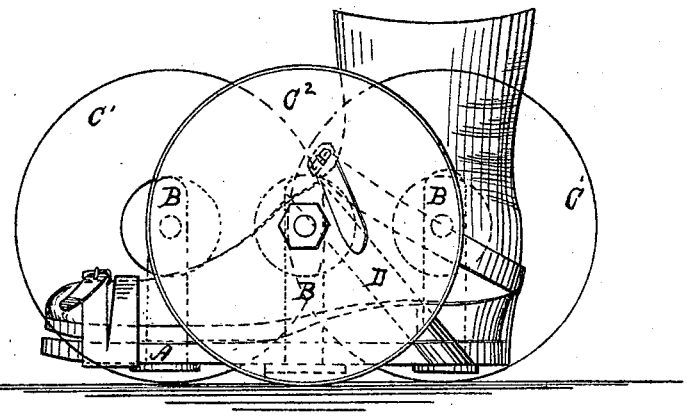
Figure 2:
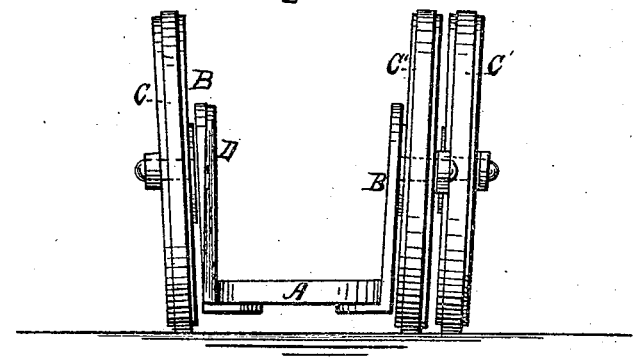

Figure 1 is a side view of my improved skate. Fig. 2 is a rear view of the same.

Similar letters of reference indicate corresponding parts.

My invention has for its object to furnish an improved parlor and sidewalk skate, which shall be so constructed and arranged as to run with little friction, and to pass over obstructions, adapting it for use in the parlor, upon the sidewalk, or upon a street paved with Nicholson or other similar pavement; and it consists in the arrangement of the foot-piece and wheels with each other, as hereinafter more fully described.

A is the foot-piece, to which the foot is secured in the same manner as to an ordinary ice-skate. B are the uprights or standards, the lower ends of which are bent or curved inward and made broad, so that they may be conveniently and firmly attached to the under side of the foot-piece A.

To the upper part of the uprights B are attached, or upon them are formed, outwardly-projecting journals, upon which the wheels $C^1$ $C^2$ revolve. The wheels $C^1$ $C^2$ are made large, and are arranged, the two former upon the outer side and the latter upon the inner side, of the foot-piece A, as shown in Figs. 1 and 2.

The two wheels $C^1$ $C^1$ may be so arranged as to overlap each other, to make the skate more compact, and at the same time allow the use of large wheels.

For an ordinary sized skate I prefer to make the wheels $C^2$ $C^1$ about nine inches in diameter, so that they may easily pass over any unevenness or obstructions upon the surface upon which they are being used. This construction also brings the foot-piece A close to the ground, giving stability to the skates, and enabling them to be used with less liability to strain the foot than when small wheels or rollers are used and placed beneath the foot-piece in the ordinary manner.

If desired, a brace-bar, D, may be extended from the rear part of the inner side of the foot-piece A to the upper end of the inner upright B, to give a better support to the foot. It should be observed that the inner or single wheel should be placed at or near the middle part of the side of the foot, as shown in Fig. 1.

Having thus described my invention, I claim as new and desire to secure by Letters Patent—

A skate having its three wheels arranged relatively to the foot-piece, substantially as shown and described.

N. W. HUBBARD.

Witnesses:
 FRANK BLOCKLEY,
 JAMES T. GRAHAM.